Patented Aug. 14, 1951

2,563,819

UNITED STATES PATENT OFFICE 2,563,819

DYESTUFFS

Samuel Coffey, David Alexander Whyte Fairweather, David Ernest Hathway, and Frank Hayhurst Slinger, Blackley, Manchester, England, assignors to Imperial Chemical Industries Limited, a corporation of Great Britain No Drawing. Application November 18, 1947, Serial No. 786,794. In Great Britain November 22, 1946

8 Claims. (Cl. 260—316)

This invention relates to new dyestuffs and more particularly to a process for the manufacture of new leuco sulphuric ester derivatives of the carbazoles obtained by ring closing anthrimides containing one or more benzoylamino substituents.

It has been proposed to make sulphuric esters of leuco derivatives of vat dyestuffs by treating the leuco derivative of the vat dyestuff with for example chlorosulphonic acid in the presence of a tertiary base for example pyridine or by treating the vat dyestuff itself in tertiary base suspension in the presence of a metal with sulphur trioxide or with a substance which can give rise to sulphur trioxide in the reaction mixture. Also in British Specification No. 274,156 it was proposed to react the vat dyestuff in tertiary base suspension with the metal before the addition of sulphur trioxide, and a process was described for the manufacture of derivatives of vat dyestuffs by reacting a quaternary ammonium halide which may be obtained by the reaction between a tertiary organic base and an alkyl halide, in tertiary organic base suspension, with a metal, reacting the product with a vat dyestuff, and then reacting the resulting mixture with the product obtained by the interaction of a tertiary base with a reagent adapted to yield the sulphuric anhydride compound of the tertiary base, for example an alkyl chlorsulphonate, chlorsulphonic acid, oleum or sulphur trioxide. Pyridine and dimethylaniline were mentioned as examples of bases which could be used in the process.

According to our experiments however the carbazoles derived from anthrimides containing two or more anthraquinone nuclei and which carry as substituents one or more benzoylamino groups cannot be converted satisfactorily into the sulphuric esters of their leuco derivatives by any of the methods hitherto known for converting vat dyestuffs into the sulphuric esters of their leuco derivatives. By these hitherto known processes we have found that low yields of soluble derivatives can be obtained from these carbazoles but that these soluble derivatives do not give the true shades of the parent vat dyestuffs when applied to the fibre by the usual methods. These soluble derivatives are not true leuco sulphuric esters, that is, these prior art derivatives are not fully sulphated in that they do not contain a sulphuric ester group on each meso carbon atom of the basic anthraquinone nuclei nor do they give, when oxidized, the true shades of the parent dyestuffs. We have now found however that these carbazoles can be converted into the sulphuric esters of their leuco derivatives when instead of using pyridine or other tertiary base in the above described process, there is used an organic amide in which the hydrogen atoms attached to the amide nitrogen atom have been replaced by hydrocarbon radicles or substituted hydrocarbon radicles. The leuco sulphuric esters so obtained give the true shades of the parent dyestuffs on the fibre when applied by the usual methods.

According to our invention therefore we provide a process for the manufacture of leuco sulphuric ester derivatives of carbazoles which contain two or more anthraquinone nuclei and which carry as substituents one or more benzoylamine groups, characterised in that the formation of the leuco sulphuric esters is carried out in the presence of an organic amide in which the hydrogen atoms attached to the amide nitrogen atom have been replaced by hydrocarbon radicles or substituted hydrocarbon radicles.

As suitable carbazoles for use in the reaction there may be mentioned for example 4:5'-dibenzoylamino - 1:1' - dianthrimide - 2:2' - carbazole, 5':5''-dibenzoylamino - 1:1':5:1'' - trianthrimide - 2:2':6:2'' - dicarbazole, 4:4':4'' - tribenzoylamino-1:1':8:1'' - trianthrimide - 2:2':-7:2''- dicarbazole, 5:5'-dibenzoylaminoylamino-1:1'-dianthrimide-2:2' - carbazole, 5 - benzoylamino - 1:1' - dianthrimide - 2:2' - carbazole, 4:5':5'' - tribenzoylamino - 1:1'8:1'' - trianthrimide-2:2':7:2''-dicarbazole and 5':5''-dibenzoylamino - 1:1':4:1'' - trianthrimide-2:2':-3:2''-dicarbazole.

As examples of suitable amides for use in the reaction there may be mentioned amides derived from carboxylic acids for example dimethylformamide, diethylformamide, dimethylacetamide and tetramethylurea and amides derived from sulphonic acids for example N:N-diethyl-p-toluenesulphonamide. Diluents such as for example acetone and acetonitrile may also be added to the reaction mixture.

The formation of the leuco sulphuric esters may be carried out by treating the carbazole in the presence of the organic amide and a metal for example zinc, copper, and iron with sulphur trioxide or with the addition compound of sulphur trioxide and an organic amide or tertiary base or with any known substance for forming sulphuric esters from vat dyestuffs in the presence of metals, from leuco compounds or metal salts thereof or complex compounds comprising the metal salts thereof. By a known substance we mean a substance actually used for this purpose or whose use is disclosed in the literature on the subject.

Alternatively instead of the carbazole itself and a metal there may be used a metal salt of the corresponding leuco compound. In general it is preferred to use the metal salt of the corresponding leuco compound or the complex compound comprising the metal salt of the corresponding leuco compound which may be made for example by reacting the parent vat dyestuff with a metal, for example zinc, in the presence of an organic amide as hereinbefore defined and preferably in the presence of a small quantity of a salt, for example potassium methyl sulphate.

The products made by the process of this invention may conveniently be isolated by pouring the reaction mixture into an aqueous solution of sodium carbonate, filtering and concentrating the filtrate and then salting out the sodium salt of the leuco sulphuric ester from the concentrated filtrate.

The products may if desired be converted into dry powders by methods previously used for making dry powders from leuco sulphuric ester salts of vat dyestuffs, and may be applied to textile materials by dyeing, printing or padding processes.

The invention is illustrated but not limited by the following examples in which the parts are by weight.

*Example 1*

15.5 parts of methylchlorosulphonate are added with stirring and cooling to a mixture of 20 parts of dimethylformamide and 16 parts of acetone. To the solution of dimethylformamide sulphur trioxide so formed is added 6.65 parts of 4:5'-dibenzoylamino-1:1'-dianthrimide-2:2'-carbazole (which may be obtained by ring closing 4:5'-dibenzoylamino-1:1'-dianthrimide) in a fine state of division and then 2.7 parts of finely divided iron powder.

The mixture is stirred at 15° C.–20° C. for 2½ hours and is then poured into 260 parts of 5% sodium carbonate solution. The metal residues are separated by filtration and the filtrates are distilled in vacuo to remove dimethylformamide and to concentrate the aqueous solution. The leuco sulphuric ester is salted out with sodium chloride and may be dried in presence of sodium carbonate and a dispersing agent or agglutinant if desired. It dissolves readily in water to give a yellow solution. When dyed, padded or printed on fabrics in the usual manner it yields brown shades of good fastness properties. Chemical analysis indicates that this particular sulphuric ester derivative contains four sulphuric ester groups per molecule.

*Example 2*

11.2 parts of alpha-picoline are added to the reaction product of 60 parts of dimethylformamide and 15.5 parts of methyl chlorosulphonate. To this mixture 6.65 parts of the dyestuff used in Example 1 and 4 parts of iron powder are added. The mixture is heated to 50° C. during ½ hour and stirred at 50° C. for 4 hours. The reaction mixture is poured into 300 parts of a mixture of ice and water containing 16 parts of sodium carbonate and the leuco sulphuric ester is isolated as described in Example 1.

*Example 3*

4.42 parts of finely divided 5':5''-dibenzoylamino-1:1':5:1''-trianthrimide-2:2':6:2''-dicarbazole (which may be obtained by ring closing 5':5'' - dibenzoylamino - 1:1':5:1'' - trianthrimide) are added to a vigorously stirred suspension of 3 parts of zinc dust in 30 parts of dimethylformamide and 0.3 parts of potassium methyl sulphate at 0° C. The mixture is stirred for 15 minutes in a reaction vessel from which the air has been displaced by nitrogen. The reaction product obtained by adding 11.7 parts of methyl chlorosulphonate to 20 parts of dimethylformamide is then added and the mixture is stirred for a further 15 minutes and then poured into a 5% solution of sodium carbonate in water. The mixture is filtered and the filtrate is distilled in vacuo until sodium sulphate begins to separate in the still. Water is then gradually added to maintain the volume in the still constant and distillation is continued until about 500 parts of water have been added. The leuco sulphuric ester is then salted out, filtered off, washed with a 10% aqueous solution of sodium carbonate, mixed with dextrin and dried in vacuo. The product can be applied to fabrics in the usual way, giving orange-brown shades of good fastness.

*Example 4*

To 70 parts of dimethylformamide there are added 5 parts of 4:4':4'' - tribenzoylamino-1:1':8:1'' - trianthrimide - 2:2':7:2'' - dicarbazole (which may be obtained by ring closing 4:4':4:4'' - tribenzoylamino - 1:1':8:1'' - trianthrimide), 3 parts of zinc dust and 1 part of potassium ethyl sulphate. The reaction mixture is stirred in an inert atmosphere at 60° C., for 30 minutes and then cooled to 0° C. 60 parts of a solution of dimethylformamide sulphur trioxide in dimethylformamide equivalent to 10 parts of sulphur trioxide are then added and the mixture is stirred and cooled in an ice bath for 30 minutes. The mixture is then poured into a solution of 15 parts of sodium carbonate in 300 parts of water and the metal residues separated by filtration. The leuco sulphuric ester is isolated by distilling in vacuo and salting out as described in Example 3.

The product dissolves in water to give a brown solution and can be applied to textile materials by the usual methods of dyeing, padding and printing to give fast brown shades. Chemical analysis indicates that this particular sulphuric ester derivative contains six sulphuric ester groups per molecule.

*Example 5*

A mixture of 50 parts of dimethylformamide, 6.65 parts of 5:5'-dibenzoylamino-1:1'-dianthrimide-2:2'-carbazole (which may be obtained by ring closing 5:5'-dibenzoylamino-1:1'-dianthrimide), 4 parts of zinc dust and 0.8 part of potassium ethyl sulphate is stirred in an inert atmosphere at 40° C. for 50 minutes, when a red-brown solution is obtained. This is cooled to 0° C. and the product of the reaction of 12 parts of sulphur trioxide with 50 parts of dimethylformamide is added. The mixture is stirred for 30 minutes in an ice bath and then poured into a solution of 20 parts of sodium carbonate. The product is isolated as described in Example 3.

The leuco sulphuric ester is freely soluble in water and is applied to textile materials in the usual manner.

*Example 6*

5.4 parts of 5-benzoylamino-1:1'-dianthrimide-2:2'-carbazole (which may be obtained by ring closing 5-benzoylamino - 1:1' - dianthrimide) 4 parts of zinc powder, 1 part of sodium 2-naphthalene suphonate and 40 parts of dimethylformamide are stirred together under an inert atmosphere for 1 hour at 17° C. The product obtained by reacting 21 parts of methyl chlorosulphonate and 40 parts of dimethylformamide is added and the mixture stirred at 0° C. for 30 minutes. A brown solution exhibiting a green fluorescence is obtained. This solution is then poured into 400 parts of aqueous 10% sodium carbonate solution. Zinc carbonate and dimethylformamide are removed as described in Example 3 and the leuco sulphuric ester salted out. The product may be made into a powder by mixing with dextrin and sodium carbonate and drying. When the product is applied by the usual dyeing, padding and printing methods, bright reddish-yellow shades are obtained.

*Example 7*

5 parts of 4:5′:5″-tribenzoylamino-1:1′:8:1″-trianthrimide-2:2′:7:2″-dicarbazole, 3 parts of zinc, 1 part of sodium β-naphthalene sulphonate and 50 parts of dimethylformamide are stirred together, under an atmosphere of nitrogen for 20 hours at 20° C. The red reaction mixture is stirred at 0° C. and the product obtained by reacting 21 parts of methylchlorosulphonate with 40 parts of dimethylformamide is added. The mixture is stirred for 30 minutes and a brown solution is obtained. This solution is then poured into 400 parts of aqueous 10% sodium carbonate solution. Zinc carbonate and dimethylformamide are removed as described in Example 3, and the brown leuco sulphuric ester is salted out from the filtered solution. The product is made into a powder by mixing with sodium carbonate and dextrin and drying. Chemical analysis indicates that this particular sulphuric ester derivative contains six sulphuric ester groups per molecule.

*Example 8*

A mixture of 8.8 parts of 5′:5″-dibenzoylamino-1:1′:4:1″-trianthrimide-2:2′:3:2″-dicarbazole (which may be made by ring closing 5′:5″-dibenzoylamino-1:1′:4:1″-trianthrimide), 6 parts of zinc, 1 part of sodium 2-naphthalene sulphonate and 80 parts of dimethylformamide is stirred in an inert atmosphere at 40° C. for 1 hour when a red-brown solution is obtained. The solution is cooled to 30° C. and 50 parts of a suspension of dimethylformamide sulphur trioxide in dimethylformamide (containing 40% sulphur trioxide) is added. The mixture is stirred for 30 minutes at 30° C. and then poured into 500 parts of aqueous 10% sodium carbonate solution. The leuco sulphuric ester is isolated by distilling in vacuo and salting out as described in Example 3.

When the product is applied to textile material by the customary dyeing, padding and printing methods, bright reddish-brown shades are obtained.

*Example 9*

5.4 parts of 5-benzoylamino-1:1′-dianthrimide-2:2′-carbazole, 4 parts of zinc dust, 1 part of sodium 2-naphthalene sulphonate and 40 parts of dimethylformamide are stirred together, under an inert atmosphere for 1 hour at 17° C. The product of the reaction is added under an inert atmosphere, to 60 parts of a stirred suspension of dimethylformamide sulphur trioxide in dimethylformamide (containing 40% sulphur trioxide) at 0° C. The mixture is stirred for 30 minutes and the leuco sulphuric ester is isolated as described in Example 6.

*Example 10*

5.4 parts of 5-benzoylamine-1:1′-dianthrimide-2:2′-carbazole, 4 parts of zinc dust, 1 part of methyltriethylammonium chloride, 40 parts of N-formomorpholide and 10 parts of acetone are stirred for 5 minutes at 25° C. The product obtained by reacting 40 parts of methylchlorosulphonate and 60 parts of N-formomorpholide is then added and the mixture so obtained is stirred at 0° C. for 10 minutes. A brown solution with a green fluorescence is obtained, from which the leuco sulphuric ester is isolated as described in Example 6.

We claim:

1. The new leuco sulphuric ester of 4:5′dibenzoylamino-1:1′-dianthrimide-2:2′-carbazole, containing four sulphuric ester groups.

2. The new leuco sulphuric ester of 4:5′:5″-tribenzoylamino-1:1′:8:1″-trianthrimide-2:2′:7:2″-dicarbazole containing six sulphuric ester groups.

3. The new leuco sulphuric ester of 4:4′:4″-tribenzoylamino-1:1′:8:1″-trianthrimide-2:2′:7:2″-dicarbazole containing six sulphuric ester groups.

4. New leuco sulphuric ester derivatives of anthrimide carbazoles which contain $n$ anthraquinone nuclei connected together by $(n-1)$-NH— linkages joining the α-positions and $(n-1)$ direct linkages joining the adjacent β-positions and which carry $m$ benzoylamino groups, wherein $n$ is an integer greater than one and $m$ is at least one, said sulphuric ester derivatives containing a sulphuric ester group attached to each meso carbon atom of the basic anthraquinone nuclei.

5. Process according to claim 7 wherein the carbazole is 4:5′-dibenzoylamine-1:1′-dianthrimide-2:2′-carbazole.

6. Process according to claim 7 wherein the carbazole is 5:5′:5″-tribenzoylamine-1:1′:8:1″-trianthrimide-2:2′:7:2″-dicarbazole.

7. A process for the manufacture of leuco sulphuric ester derivatives of anthramide carbazoles which contain $n$ anthraquinone nuclei connected together by $(n-1)$—NH— linkages joining the α-positions and $(n-1)$ direct linkages joining the adjacent β-position and which carry $m$ benzoylamino groups, wherein $n$ is an integer greater than one and $m$ is at least one, said sulphuric ester derivatives containing a sulphuric ester group attached to each meso carbon atom of the basic anthraquinone nuclei, characterized in that the formation of the leuco sulphuric esters is carried out in the presence of a non-vattable amide selected from the group consisting of formomopholide and amides of carboxylic and sulphonic acids having the formula:

wherein A represents the acid radical of the amide and R represents a lower alkyl radical.

8. A process as claimed in claim 7 wherein said amide is dimethylformamide.

SAMUEL COFFEY.
DAVID ALEXANDER WHYTE FAIRWEATHER.
DAVID ERNEST HATHWAY
FRANK HAYHURST SLINGER.

REFERENCES CITED

The following references are of record in the file of this patent:

UNITED STATES PATENTS

| Number | Name | Date |
|---|---|---|
| 1,974,866 | Hauser | Sept. 25, 1934 |
| 2,026,150 | Utzinger | Dec. 31, 1935 |
| 2,027,908 | Hauser | Jan. 14, 1936 |
| 2,027,909 | Hauser | Jan. 14, 1936 |
| 2,272,012 | Kern | Feb. 3, 1942 |
| 2,403,226 | Lecher et al. | July 2, 1946 |